United States Patent
Nakazato

(10) Patent No.: US 10,353,332 B2
(45) Date of Patent: Jul. 16, 2019

(54) IMAGE FORMING APPARATUS INCLUDING SENSOR HAVING SUBSTRATE ON WHICH LIGHT-EMITTING ELEMENT AND LIGHT-RECEIVING ELEMENT ARE PROVIDED

(71) Applicant: CANON KABUSHIKI KAISHA, Tokyo (JP)

(72) Inventor: Jun Nakazato, Noda (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/830,642

(22) Filed: Dec. 4, 2017

(65) Prior Publication Data
US 2018/0173145 A1 Jun. 21, 2018

(30) Foreign Application Priority Data
Dec. 21, 2016 (JP) .................. 2016-248062

(51) Int. Cl.
*G03G 15/00* (2006.01)
*H04N 1/00* (2006.01)

(52) U.S. Cl.
CPC ..... *G03G 15/5062* (2013.01); *G03G 15/5058* (2013.01); *H04N 1/00034* (2013.01); *H04N 1/00082* (2013.01); *G03G 15/5041* (2013.01); *G03G 2215/00616* (2013.01)

(58) Field of Classification Search
CPC ........... G03G 15/5058; G03G 15/5041; G03G 2215/00042; G03G 2215/00059; G03G 2215/0164; G03G 15/0131; G03G 2215/0132
See application file for complete search history.

(56) References Cited

U.S. PATENT DOCUMENTS 5,773,827 A * 6/1998 Yazdy ................ G03G 15/5041
250/341.8
2005/0047834 A1* 3/2005 Tomita ............... G03G 15/0131
399/301

(Continued)

FOREIGN PATENT DOCUMENTS

JP 2008-209821 A 9/2008

*Primary Examiner* — Victor Verbitsky
(74) *Attorney, Agent, or Firm* — Canon U.S.A., Inc. IP Division

(57) ABSTRACT

An image forming apparatus includes an image forming unit configured to form an image, a reference member, a sensor including a substrate, a light-emitting element provided on the substrate, a light-receiving element provided on the substrate, and a blocking member provided between the light-emitting element and the light-receiving element on the substrate, the sensor configured to output an output value based on a light reception result of the light-receiving element, a memory storing data related to a relationship between a measurement condition and an offset value, and a controller configured to control the sensor based on a plurality of measurement conditions to acquire an output value corresponding to a measurement result of reflected light from the reference member, and determine a measurement condition for measuring the image based on the acquired output value and the data stored in the memory.

12 Claims, 10 Drawing Sheets

(56) References Cited

U.S. PATENT DOCUMENTS

| | | | |
|---|---|---|---|
| 2005/0063718 A1* | 3/2005 | Oki | G03G 15/5058 399/27 |
| 2006/0274628 A1* | 12/2006 | Tanaka | G03G 15/1605 369/100 |
| 2007/0036568 A1* | 2/2007 | Shida | G03G 15/0194 399/49 |
| 2008/0187336 A1* | 8/2008 | Itagaki | G03G 15/0131 399/52 |
| 2012/0237233 A1* | 9/2012 | Kato | G03G 15/0131 399/49 |
| 2015/0003853 A1* | 1/2015 | Nakagawa | G03G 15/5058 399/49 |
| 2015/0227103 A1* | 8/2015 | Ogata | G01S 17/026 399/405 |
| 2017/0131657 A1* | 5/2017 | Monden | G03G 15/556 |
| 2017/0131670 A1* | 5/2017 | Ino | G03G 15/0178 |
| 2017/0153569 A1* | 6/2017 | Nagashima | G03G 15/0409 |

* cited by examiner

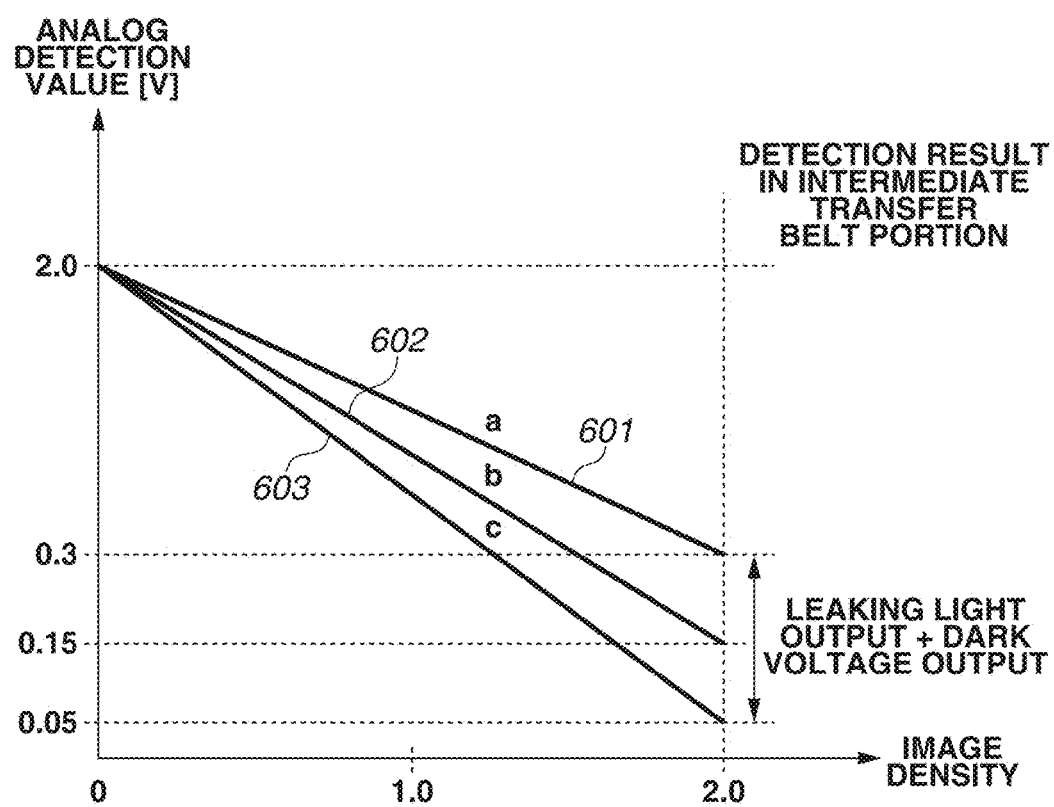

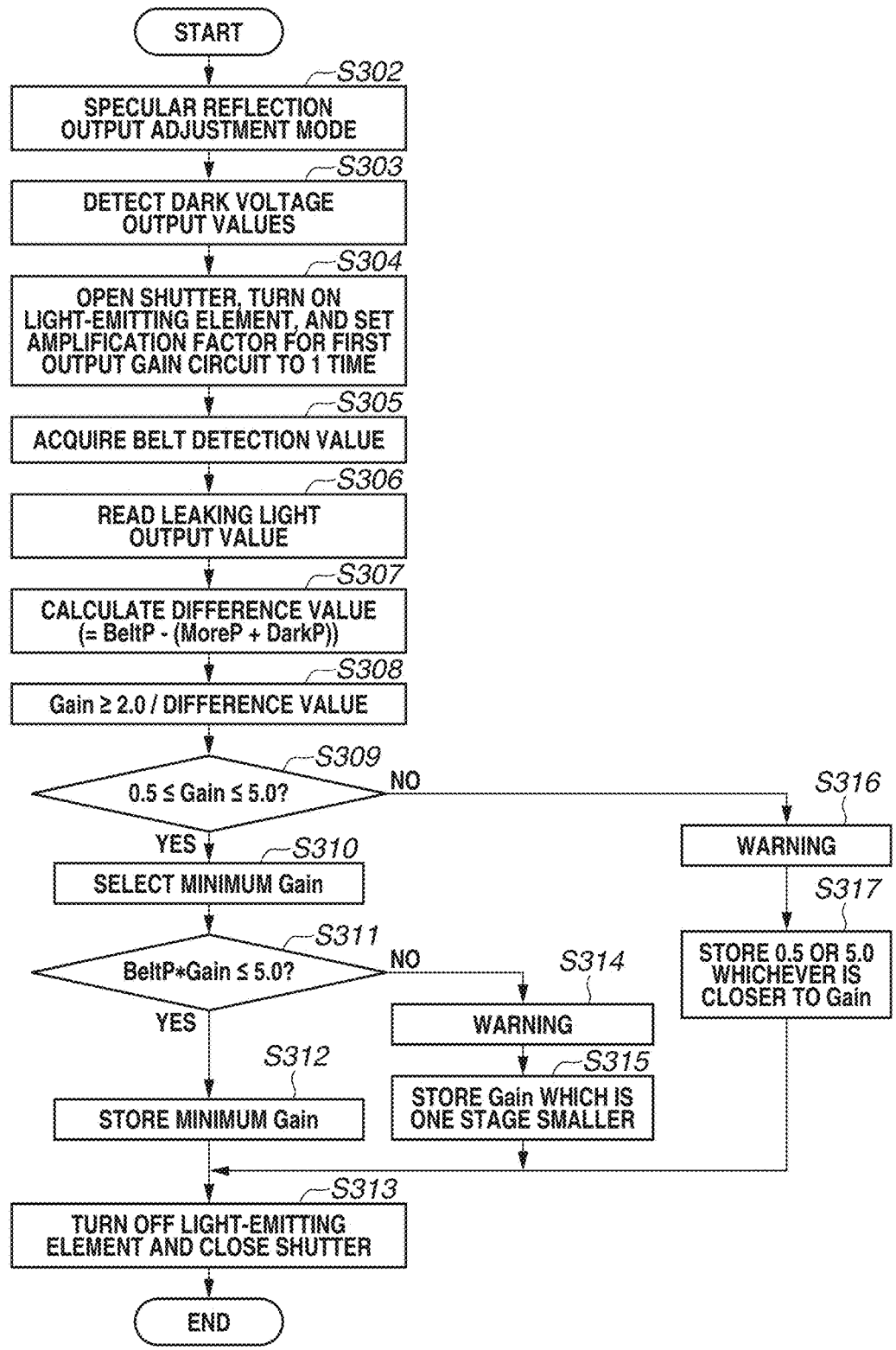

IMAGE FORMING APPARATUS INCLUDING SENSOR HAVING SUBSTRATE ON WHICH LIGHT-EMITTING ELEMENT AND LIGHT-RECEIVING ELEMENT ARE PROVIDED

BACKGROUND OF THE INVENTION

Field of the Invention

The aspect of the embodiments relates to the process of determining a measurement condition for a sensor having a substrate on which a light-emitting element and a light-receiving element are provided.

Description of the Related Art

An image forming apparatus using an electrophotographic process method has the function of causing an image density sensor having a light-emitting element and a light-receiving element to detect the image density of a toner image formed on an image bearing member such as an intermediate transfer member, and appropriately adjusting the image density according to the detection result. The image density sensor is controlled to periodically adjust the driving current of the light-emitting element in response to a toner stain or a secular change of the light-emitting element, thereby keeping a detection value which is a detection result constant within a predetermined range (the publication of Japanese Patent Application Laid-Open No. 2008-209821). In an image density sensor (a specular-reflection-type image density sensor) for receiving specularly reflected light to detect image density, a detection value in an image bearing member portion is higher than a detection value in a toner image portion. That is, the image density sensor detects a change in the amount of specularly reflected light from the image bearing member, which changes according to the image density of a toner image. In the specular reflection image density sensor, the driving current of a light-emitting element is adjusted so that the detection value in the image bearing member portion falls within a predetermined range. After a print operation for a predetermined number of sheets is performed, or when the image density sensor is started, the driving current of the light-emitting element is adjusted, so that the image density sensor prevents a change in the amount of light of the light-emitting element due to the toner stain or the secular change, from influencing a detection result.

An image density sensor can be downsized or made inexpensive by using a surface-mounted light-emitting element and a surface-mounted light-receiving element. The surface-mounted light-emitting element and the surface-mounted light-receiving element are directly mounted on the surface of a substrate. Thus, it is difficult to construct the elements which periphery are covered with a resin as in a bullet-shaped component. Whence, light emitted from the light-emitting element propagates on the surface of the substrate, enters an inner layer of the substrate, and easily reaches the light-receiving element. Light directly reaching the light-receiving element from the light-emitting element is referred to as "leaking light". An amount of the leaking light differs from one image density sensor to another due to component tolerance and variation in assembly accuracy. Further, if an amount of light emission of the light-emitting element is increased by increasing the driving current according to the toner stain, the amount of leaking light increases accordingly.

In image density sensors in which the light leaking occurs, in a case where the detection value as a detection result is controlled such that it is maintained at a constant value within a predetermined range, the individual differences between the image density sensors do not influence detection values in an image bearing member portion. If, however, the image density of a toner image portion is high, individual differences occur in the image density sensors due to the influence of the leaking light. Thus, the output offsets of detection values are high, and variation in the detection values is great. Further, in addition to the individual differences between the image density sensors, also in a case where the driving current of a light-emitting element is increased or the output gain of a light-receiving element is increased to reduce the influence of the toner stain, the amount of leaking light increases. Therefore, even in the same image density sensor, a sensitivity characteristic of image density changes with an increase in the amount of leaking light. As described above, the individual differences in sensitivity characteristic between image density sensors become large due to the amount of leaking light, and the sensitivity characteristic of each image density sensor changes every time the driving current of a light-emitting element is adjusted or the output gain of a light-receiving element is switched. The change in the sensitivity characteristic of the image density sensor makes it difficult to accurately detect image density and hinders accurate density correction. As a result, quality of an image formed by an image forming apparatus decreases.

SUMMARY OF THE INVENTION

According to an aspect of the embodiments, an image forming apparatus includes an image forming unit configured to form an image, a reference member, a sensor including a substrate, a light-emitting element provided on the substrate, a light-receiving element provided on the substrate, and a blocking member provided between the light-emitting element and the light-receiving element, the sensor configured to output an output value based on a light reception result of the light-receiving element, a memory storing data related to a relationship between a measurement condition and an offset value, and a controller configured to control the sensor based on a plurality of measurement conditions to acquire an output value corresponding to a measurement result of reflected light from the reference member, and determine a measurement condition for measuring the image based on the acquired output value and the data stored in the memory.

Further features of the disclosure will become apparent from the following description of exemplary embodiments with reference to the attached drawings.

BRIEF DESCRIPTION OF THE DRAWINGS

FIG. 3 is a diagram illustrating examples of characteristics of image density sensors.

FIG. 10 is a flowchart illustrating adjustment control of a specular reflection output.

DESCRIPTION OF THE EMBODIMENTS

Figure 1:
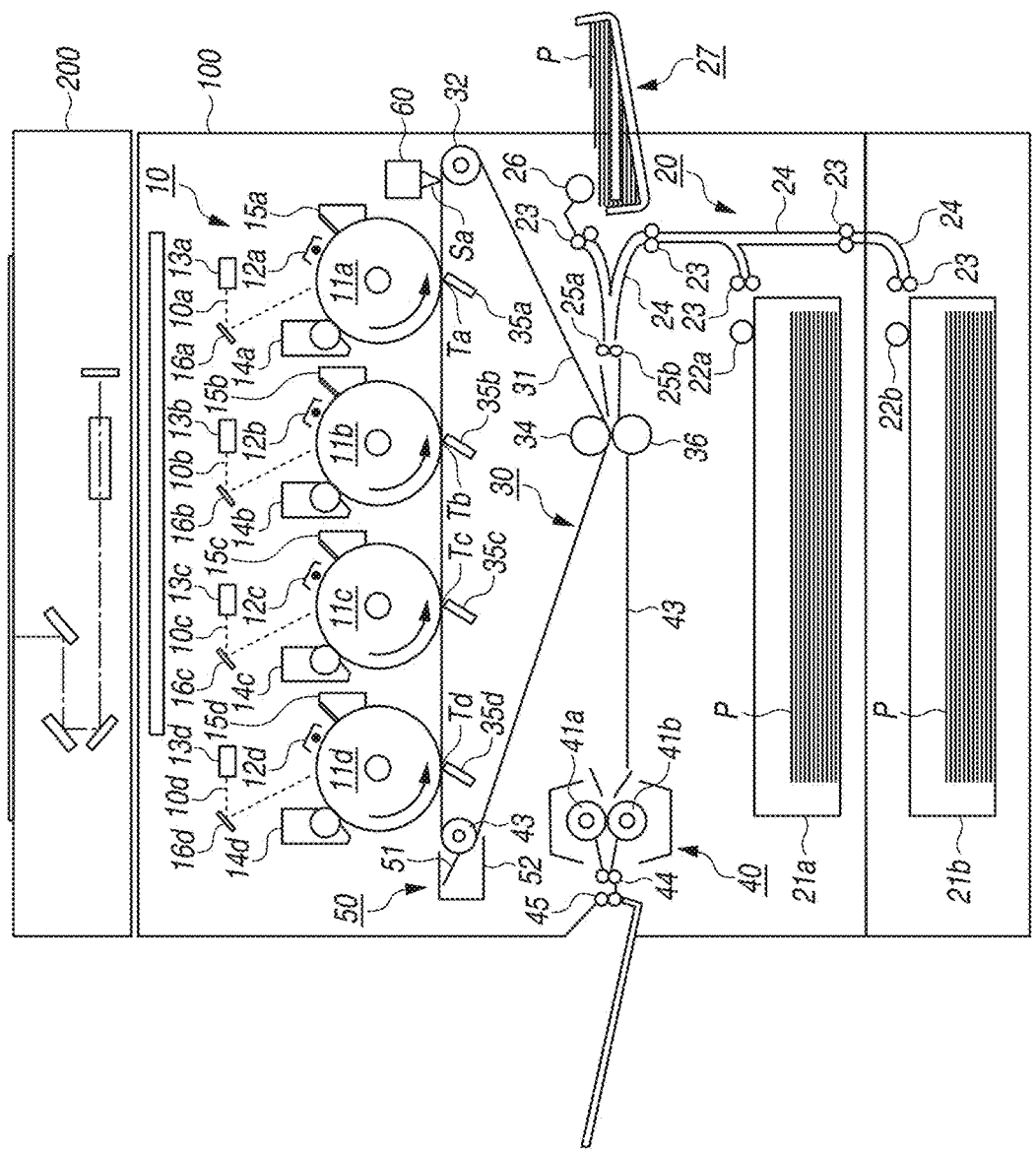
FIG. 1 is a diagram illustrating a general configuration of an image forming apparatus.

With reference to FIG. 1, an example of the general configuration of an image forming apparatus according to the present exemplary embodiment is described. The image forming apparatus is a color electrophotographic apparatus in which four image forming units corresponding to four colors, namely yellow, cyan, magenta, and black, are arranged in parallel and which employs an intermediate transfer method.

The image forming apparatus includes a printer unit 100, which prints an image on a sheet, and a reader unit 200, which reads a document and transmits an image of the document to the printer unit 100. The printer unit 100 includes image forming units 10 (10a, 10b, 10c, and 10d), which correspond to yellow, cyan, magenta, and black colors, a sheet feeding unit 20, an intermediate transfer unit 30, and a fixing unit 40. These units are controlled by a control unit (not illustrated) incorporated in the image forming apparatus.

In the image forming units 10a, 10b, 10c, and 10d (hereinafter, referred to as "the image forming units 10"), photosensitive drums 11a to 11d, which are image bearing members, are rotatably and axially supported, and driven to rotate in directions of arrows. Near outer peripheral surfaces of the photosensitive drums 11a to 11d, primary charging devices 12a to 12d, optical systems 13a to 13d, returning mirrors 16a to 16d, developing devices 14a to 14d, and drum cleaners 15a to 15d are placed.

The primary charging devices 12a to 12d impart a uniform amount of electric charge to the surfaces of the photosensitive drums 11a to 11d. Then, based on a signal modulated according to a recording image signal from the reader unit 200, the optical systems 13a to 13d expose the photosensitive drums 11a to 11d to laser beams via the returning mirrors 16a to 16d. Consequently, electrostatic latent images are formed on the photosensitive drums 11a to 11d. Further, the electrostatic latent images are developed into visible images by the developing devices 14a to 14d, which contain developers (hereinafter referred to as "toners") of four colors, namely yellow, cyan, magenta, and black. These visible images are transferred onto an endless belt-like intermediate transfer belt 31, which is an image bearing member of the intermediate transfer unit 30, in image transfer regions Ta, Tb, Tc, and Td. Downstream of the image transfer regions Ta, Tb, Tc, and Td, the drum cleaners 15a, 15b, 15c, and 15d scrape off toner that has not been transferred onto the intermediate transfer member and remains on the photosensitive drums 11a to 11d, thereby cleaning the surfaces of the drums.

By the above process, images are formed using the toners of the respective colors. Downstream of a secondary transfer region Te of the intermediate transfer belt 31, a belt cleaner 50, which cleans an image formation surface of the intermediate transfer belt 31, is placed. The belt cleaner 50 includes a cleaning blade 51, which removes toner on the intermediate transfer belt 31, and a toner collect box 52, which stores collected toner.

The sheet feeding unit 20 includes cassettes 21a and 21b, a manual feed tray 27, pickup rollers 22a, 22b, and 26, which send out sheets P one by one, sheet feeding roller pairs 23, which further convey each sheet P, and sheet feeding guides 24. Further, the sheet feeding unit 20 includes registration rollers 25a and 25b, which send out the sheet P to the secondary transfer region Te at image forming timing of each image forming unit.

The fixing unit 40 includes a fixing roller 41a, which includes a heat source such as a halogen heater inside, and a pressure roller 41b, which is pressed by the fixing roller 41a (the pressure roller 41b may also include a heat source). Further, a conveyance guide 43, which guides the sheet P to a nip portion between the fixing roller 41a and the pressure roller 41b, and sheet discharge inner rollers 44 and sheet discharge outer rollers 45, which further guide the sheet P discharged from the fixing roller 41a and the pressure roller 41b to outside the apparatus, are provided.

The operation of the image forming apparatus having the above configuration is as follows. For example, if the control unit (not illustrated) gives a start signal of an image forming operation, the pickup roller 22a sends out sheets P one by one from the cassette 21a. Then, each sheet P is guided within the sheet feeding guides 24 by the sheet feeding roller pairs 23 and conveyed to the registration rollers 25a and 25b. At this time, the registration rollers 25a and 25b are at rest, and the front end of the sheet P hits a nip portion. Then, the registration rollers 25a and 25b start rotating according to the timing that the image forming units 10 start forming images. The timing of the rotation is set so that toner images transferred onto the intermediate transfer belt 31 by the image forming units 10 are transferred to a predetermined position on the sheet P in the secondary transfer region Te.

Meanwhile, in the image forming units 10, a toner image formed on the photosensitive drum 11d, which is at the furthest upstream position in the rotational direction of the intermediate transfer belt 31, is transferred onto the intermediate transfer belt 31 in the primary transfer region Td by a primary transfer charging device 35d. The toner image transferred onto the intermediate transfer belt 31 is conveyed to the next primary transfer region Tc. In the primary transfer region Tc, an image is formed with delay of the time of conveying a toner image between image forming units. When a preceding image abuts on the registration roller, the subsequent toner image is transferred. Hereafter, a similar process is repeated, and ultimately, toner images of the four colors are transferred onto the intermediate transfer belt 31.

Then, when the sheet P enters the secondary transfer region Te and comes into contact with the intermediate transfer belt 31, a high voltage is applied to a secondary transfer roller 36 according to the passing timing of the sheet P. Consequently, the toner images of the four colors formed on the intermediate transfer belt 31 are transferred onto the surface of the sheet P. Then, the sheet P is accurately guided to the nip portion by the conveyance guide 43. Then, the toner images are fixed to the surface of the sheet P by the heat of the pair of rollers 41a and 41b of the fixing unit 40 and the pressure of the nip portion. After that, the sheet P is conveyed by the sheet discharge inner rollers 44 and the sheet discharge outer rollers 45 and discharged to outside the image forming apparatus.

(Image Density Sensor)

Figure 2A:
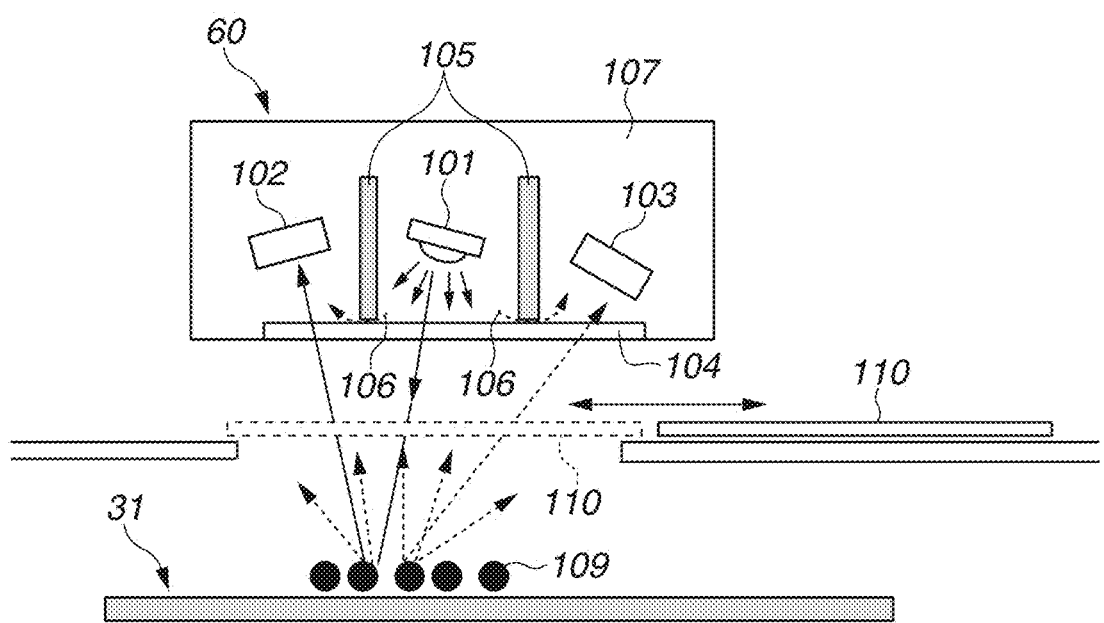
FIG. 2A is a schematic cross-sectional view of an image density sensor.
Figure 2B:
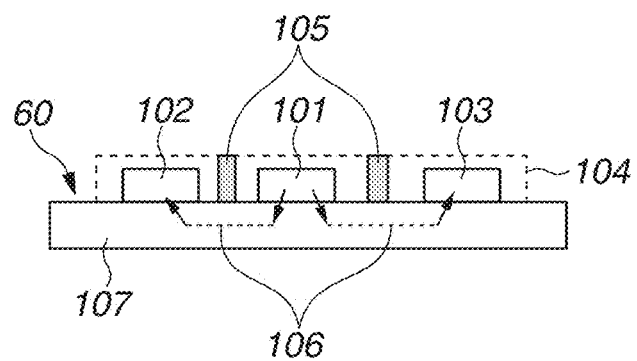
FIG. 2B is a cross-sectional view of a main part of a substrate on which a light-emitting element and a light-receiving element are provided.

FIGS. 2A and 2B are diagrams illustrating an image density sensor. As illustrated in FIG. 1, an image density sensor 60 is placed opposing the intermediate transfer belt 31 and detects the image density of a toner image 109, which is formed on the intermediate transfer belt 31. With reference to FIG. 2A, the configuration of the image density sensor 60 is described. FIG. 2A is a diagram illustrating the image density sensor 60 as viewed from an upstream side in the conveying direction of the intermediate transfer belt 31.

The image density sensor 60 includes a light-emitting element 101 such as a light-emitting diode (LED), light-receiving elements 102 and 103 such as photodiodes, a lens 104, and light-blocking members 105. The light-emitting element 101 is a unit placed at the position where the light-emitting unit emits infrared light to the intermediate transfer belt 31 at an angle of incidence of about 15 degrees. The light-receiving element 102 is a unit for receiving, at a position at a specular reflection angle, reflected light of infrared light emitted from the light-emitting element 101 to the intermediate transfer belt 31. The light-receiving element 103 is a unit for receiving, at a position at a diffuse reflection angle, scattered light of infrared light emitted from the light-emitting element 101 to the intermediate transfer belt 31. The light-emitting element 101 and the light-receiving elements 102 and 103 are mounted on a substrate 107. The substrate 107 includes a light-receiving circuit having a current/voltage conversion function for converting a current flowing through the light-receiving elements 102 and 103 according to the amounts of received light, into a voltage. The light-receiving circuit outputs as analog detection values the voltage converted by the current/voltage conversion function. The output of the light-receiving elements 102 and 103 can be set, and the dynamic range of the analog detection values can be determined according to the output gain of the light-receiving elements 102 and 103.

The lens 104 is an optical component forming a light-guiding path for light emitted from the light-emitting element 101 and light to be received by the light-receiving elements 102 and 103. The lens 104 is formed of an epoxy resin, for example. The light-blocking members 105 are provided between the light-emitting element 101 and the light-receiving element 102 and provided between the light-emitting element 101 and the light-receiving element 103. The light-blocking members 105 prevent light emitted from the light-emitting element 101 from being directly received by the light-receiving elements 102 and 103. The light-blocking members 105 are formed of a black resin, for example.

A shutter 110 is provided between the image density sensor 60 and the intermediate transfer belt 31. When the image density of the toner image 109 formed on the intermediate transfer belt 31 is to be detected, the shutter 110 enters a state indicated by a solid line (an open state). In a case where the image density of the toner image 109 is not to be detected, the shutter 110 enters a state indicated by a dotted line (a closed state). By entering the closed state, the shutter 110 moves to a position between the lens 104 and the intermediate transfer belt 31 and prevents staining of the lens 104 caused by toner. The shutter 110 includes a diffuse reflection reference plate which is used to adjust the output of the light-receiving element 103. The toner image 109 is, for example, a detection image for detecting image density.

The image density sensor 60 having such a configuration can detect image density based on both specularly reflected light and diffusely reflected light. The light-receiving element 102, which receives specularly reflected light, detects reflected light from the intermediate transfer belt 31 portion.

In a case where a black toner image 109 is formed on the intermediate transfer belt 31, the amount of reflected light decreases according to the image density of the toner image 109. Thus, the light-receiving element 102 can detect the image density of a black image. In the light-receiving element 103, which receives diffusely reflected light, the amount of received light of scattered light from the intermediate transfer belt 31 portion is minute, and the received amount of scattered light from a toner image 109 is large which is formed on the intermediate transfer belt 31 of chromatic colors of yellow, magenta, and cyan. The higher the area density of the toners of the chromatic colors, the larger the received amount of the scattered light. Thus, the light-receiving element 103 can detect the image density of an image of chromatic colors.

A description is given of leaking light from the light-emitting element 101 to the light-receiving elements 102 and 103. The leaking light passes through leaking light paths 106. The light-blocking members 105 are constructed such that they come into contact with the lens 104. It is, however, difficult for the light-blocking members 105 to completely block light because of the assembling tolerances of components. Thus, light emitted from the light-emitting element 101 passes through the spaces between the light-blocking members 105 and the lens 104 and is received by the light-receiving elements 102 and 103. Further, in a case where the image density sensor 60 is viewed from the intermediate transfer belt 31 side as illustrated in FIG. 2B, the leaking light paths 106 are formed from the light-emitting element 101 through the inside of the substrate 107 to the light-receiving elements 102 and 103. Thus, light emitted from the light-emitting element 101 is reflected by the intermediate transfer belt 31 or the toner image 109 and received by the light-receiving elements 102 and 103, and is also directly received as leaking light by the light-receiving elements 102 and 103. The light directly received from the image density sensor 60 by the light-receiving elements 102 and 103 instead of via the outside of the image density sensor 60 is "leaking light".

FIG. 3 is a diagram illustrating examples of the characteristics of three image density sensors 60a, 60b, and 60c in which the amounts of leaking light are different from each other, in a case where analog detection values of the image density sensors 60a, 60b, and 60c are controlled to be kept at constant values within a predetermined range. FIG. 3 illustrates the density detection characteristic of the image density sensor 60 where the vertical axis is an analog detection value, and the horizontal axis is the image density of a toner image formed on the intermediate transfer belt 31. Conventionally, an analog detection value is controlled to be kept at a constant value. Thus, detection results (analog detection values 601 to 603) in the intermediate transfer belt 31 portion (an image density of 0) obtained by the three image density sensors 60a, 60b, and 60c are the same values (2.0 V in this case). If, however, the image density of a toner image formed on the intermediate transfer belt 31 is high, then due to the influence of leaking light of the image density sensor 60, the output offsets of the analog detection values 601 to 603 are high, and variation occurs in the analog detection values 601 to 603. More specifically, the three image density sensors 60a, 60b, and 60c have different sensitivity characteristics with respect to image density and have individual differences. In the examples of FIG. 3, in a case where a toner image having an image density of "2.0" is formed on the intermediate transfer belt 31, a difference of 0.25 V at the maximum occurs among the analog detection values 601 to 603 of the three image density sensors 60a, 60b, and 60c.

Further, in the image density sensor 60, in addition to the individual differences, also in a case where the driving current of the light-emitting element 101 is increased to compensate for a decrease in a reflection output due to a toner stain, the amount of leaking light increases according to the amount of luminescence (the light emission intensity). Thus, even if the image density sensor 60 is the same, the characteristic of the same image density sensor 60 changes from that of the analog detection value 603 to that of the analog detection value 601 according to an increase in the amount of leaking light. In other words, the sensitivity characteristic of the image density sensor 60 in detecting the density decreases. Thus, conventionally, due to the leaking light amount, in the image density sensor 60, the individual differences in sensitivity characteristic in detecting the density are large, or the sensitivity characteristic of the image density sensor 60 changes every time the driving current of the light-emitting element 101 is adjusted. If the sensitivity characteristic in detecting the density decreases, it is not possible to correctly detect a change in image density, and accuracy in correcting an image forming condition such as density decreases.

A first exemplary embodiment is described below. In order to reduce such changes in the sensitivity characteristic in detecting the density, which come from the individual differences of the image density sensor 60 or from adjustment of the driving current, the output of the image density sensor 60 is adjusted as described below.

(Control Unit)

Figure 4:
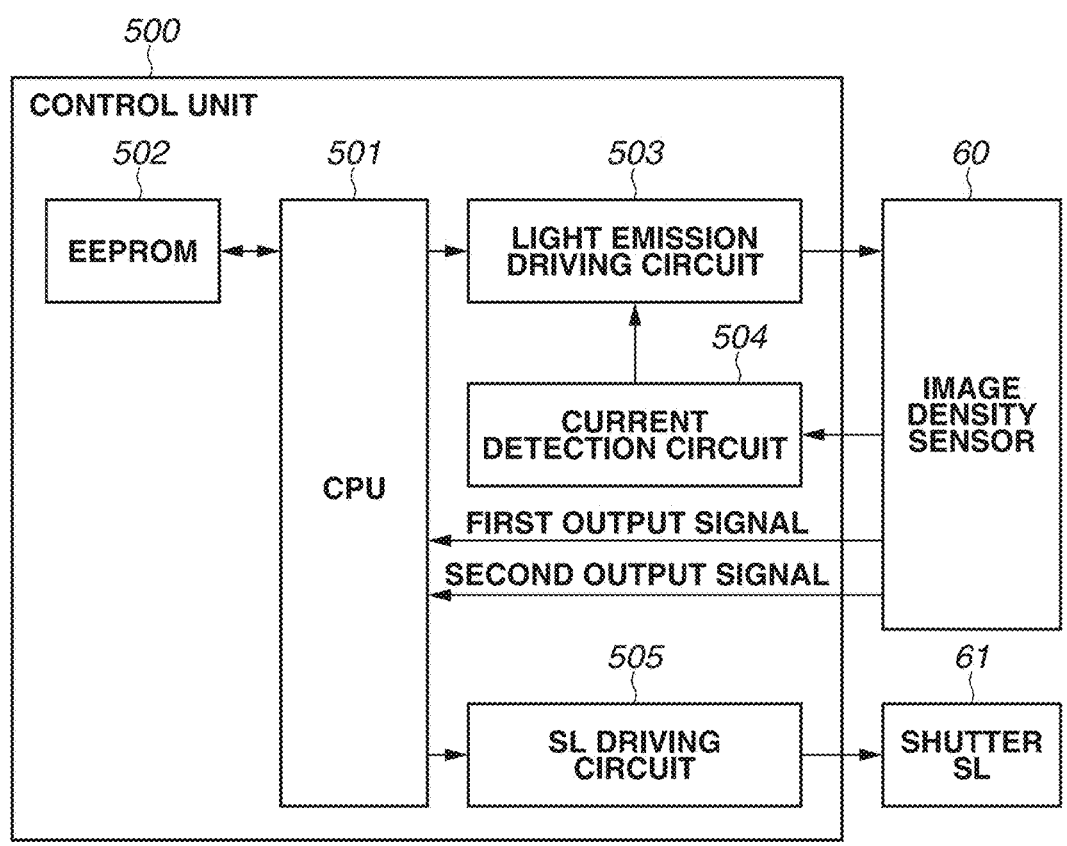
FIG. 4 is a diagram illustrating a configuration of a control unit.

FIG. 4 is a diagram illustrating the configuration of a control unit for controlling an operation of the image forming apparatus. A control unit 500 controls the operations of the components in the image forming apparatus, thereby forming an image. Herein, the configuration of the control unit 500 for correcting density is described. The control unit 500 includes a central processing unit (CPU) 501, an Electrically Erasable Programmable Read-Only Memory (EEPROM) 502, a light emission driving circuit 503, a current detection circuit 504, and a solenoid (SL) driving circuit 505. The control unit 500 may be composed of a discrete product, or achieved by a one-chip semiconductor product, for example. The one-chip semiconductor product is, for example, a microprocessor unit (MPU), an application-specific integrated circuit (ASIC), and a system on a chip (SOC).

The CPU 501 includes a memory for storing a computer program, and a memory for temporarily storing data. The CPU 501 controls the operation of the image forming apparatus by executing the computer program. The CPU 501 has the function of generating various command signals to cause various sensors and motors of the image forming apparatus to operate according to an electrophotographic process. The EEPROM 502 is a memory capable of holding data using a battery (not illustrated) even when the image forming apparatus is turned off.

The SL driving circuit 505 drives a shutter SL 61, which is a driving mechanism for opening and closing the shutter 110, which is provided in the image density sensor 60. Only during the period in which the image density sensor 60 detects the image density of a toner image, the SL driving circuit 505 drives the shutter SL 61 according to a timing signal from the CPU 501 to bring the shutter 110 into an open state. The light emission driving circuit 503 and the current detection circuit 504 have the function of driving the light-emitting element 101 of the image density sensor 60 at a certain driving current, and can vary the driving current of the light-emitting element 101 according to an instruction from the CPU 501. The light emission driving circuit 503 and the current detection circuit 504 vary the driving current of the light-emitting element 101 to adjust the luminescence amount of the light-emitting element 101.

The CPU 501 acquires a first output signal, which is a specular reflection light reception output, and a second output signal, which is a diffuse reflection light reception output, from the image density sensor 60. The first output signal is an analog detection signal output from the light-receiving element 102. The second output signal is an analog detection signal output from the light-receiving element 103. The CPU 501 converts the input first output signal and second output signal into digital data by an analog-to-digital (AD) conversion function and uses the converted digital data in predetermined arithmetic processing. For example, the CPU 501 performs the output adjustment control of the image density sensor 60 using the first and second output signals.

(Output Adjustment Control)

Figure 5:
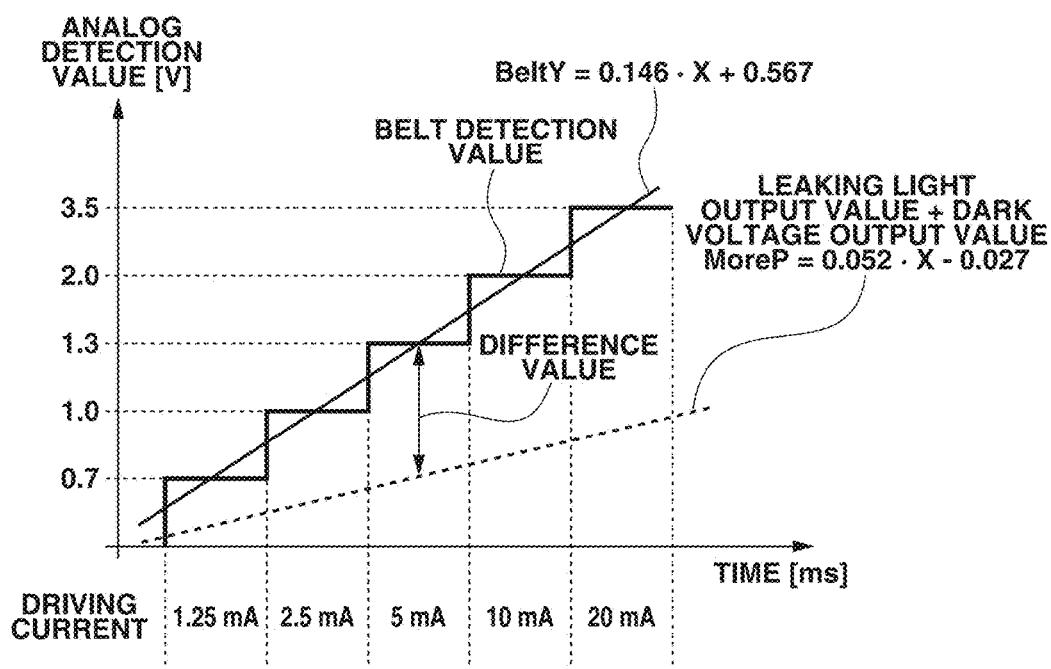
FIG. 5 is a diagram illustrating output adjustment control of the image density sensor.

FIG. 5 is a diagram illustrating the output adjustment control of the image density sensor 60.

First, the adjustment control of the specular reflection output of the image density sensor 60 is described. In the adjustment control of the specular reflection output, the driving current of the light-emitting element 101 is determined such that a difference value is a predetermined voltage which is obtained by subtracting a leaking light output value and a dark voltage output value when the light-emitting element 101 is off, from a detection result in the intermediate transfer belt 31 portion. The leaking light output value changes according to the driving current of the light-emitting element 101. The predetermined voltage (target voltage) is 2.0 V, for example. The "detection result in the intermediate transfer belt 31 portion" is an analog detection value output from the light-receiving element 102 which has detected the intermediate transfer belt 31. The detection result in the intermediate transfer belt 31 portion is referred to as a "belt detection value". The "leaking light output value" is an analog detection value output from the light-receiving element 102 according to the amount of leaking light. The "dark voltage output value" is an analog detection value output from the light-receiving element 102 when the light-emitting element 101 does not emit light.

Specifically, first, the CPU 501 indicates the current value of the driving current to the light emission driving circuit 503. According to the indication, the light emission driving circuit 503 changes a value of the driving current of the light-emitting element 101 to 1.25 mA, 2.5 mA, 5 mA, 10 mA, and 20 mA in a stepwise manner. The driving current is switched every 100 milliseconds, for example. According to each current value, the light-emitting element 101 emits light, and the image density sensor 60 detects the surface of the intermediate transfer belt 31 to output a belt detection value as a first output signal. The CPU 501 performs AD sampling on the belt detection value. When 25 milliseconds elapse after the CPU 501 gives an instruction to switch the current value of the driving current, the CPU 501 starts AD sampling, performs sampling 10 times in a 5-millisecond cycle, and calculates the average value of belt detection values of 10 pieces of data with respect to each current value. A linear approximation expression derived from the belt detection value with respect to each current value is a straight line (a solid line) indicated as BeltY=0.146·X+ 0.567.

A dark voltage output value is obtained by the CPU 501 sampling a first output signal when the light-emitting element 101 is in an off state immediately after the output adjustment control is started. The CPU 501 calculates also the dark voltage output value by averaging first output signals sampled 10 times in a 5-millisecond cycle. Since the dark voltage output value is obtained in the state where the light-emitting element 101 does not emit light, the dark voltage output value is constant independently from the driving current of the light-emitting element 101.

A leaking light output value for each current value is calculated as an estimated value because it is difficult to detect the leaking light output value in the image forming apparatus. Leaking light output values when the light-emitting element 101 is driven at driving currents of 2.5 mA and 20 mA are stored in the EEPROM 502. The EEPROM 502 can hold data even when the image forming apparatus is turned off. The leaking light output values at driving currents of 2.5 mA and 20 mA are detected in advance in the process of manufacturing the image density sensor 60 as a single item and stored in the EEPROM 502 in association with the light-receiving elements 102 and 103. From data at two points corresponding to the light-receiving element 102, a relational expression between the driving current of the light-emitting element 101 and the leaking light output value is calculated. A value obtained by adding the dark voltage output value to the leaking light output value is a dotted line in FIG. 5, which is represented by the expression MoreP=0.052·X−0.027.

The CPU 501 calculates the difference between BeltY and MoreP. The expression for calculating the difference between BeltY and MoreP is represented by the following expression.

$$(BeltY-MoreP)=(0.146X+0.567)-(0.052X-0.027)$$
$$=0.094X+0.54 \quad \text{(expression 1)}$$

If a driving current X is calculated from expression (1) at which a difference value (BeltY−MoreP) becomes a target voltage of 2.0 V, 2.0=0.094X+0.54. Thus, X=15.5 mA. The CPU 501 stores in the EEPROM 502 the driving current of 15.5 mA of the light-emitting element 101 calculated by such computing processing. In image density detection control of a next toner image, the CPU 501 drives the light-emitting element 101 at the driving current stored in the EEPROM 502. The adjustment control of the specular reflection output is thus performed.

Next, the adjustment control of the diffuse reflection output of the image density sensor 60 is described. The adjustment control of the diffuse reflection output is different mainly in the following two respects from the adjustment control of the specular reflection output. First, the adjustment control of the diffuse reflection output is performed using the diffuse reflection reference plate provided in the shutter 110. Second, when an adjustment is made such that a difference value obtained by subtracting a leaking light output value and a dark voltage output value from a detection result in the diffuse reflection reference plate is a target voltage, the target voltage differs for each image density sensor 60. The target voltage is determined when the image density sensor 60 is attached to the image forming apparatus for the first time. For example, the target voltage is a value obtained by subtracting the leaking light output value of the light-receiving element 103 at a driving current of 2.5 mA stored in the EEPROM 502 and a dark voltage output value, from an AD conversion value of a second output signal when the image density sensor 60 is driven at a driving current of 2.5 mA at the time of attachment to the image forming apparatus.

The differences from the adjustment control of the specular reflection output are specifically described. When starting the adjustment control of the diffuse reflection output, the CPU 501 changes the driving current of the light-emitting element 101 in five levels in the state where the shutter 110 is closed. Then, the CPU 501 acquires the second output signal and performs AD sampling. Consequently, the CPU 501 acquires a reference plate detection value, which is a detection result (an analog detection value) in the diffuse reflection reference plate. The dark voltage output value, leaking light output value, and driving current are calculated similarly to the adjustment control of the specular reflection output. The adjustment control of the diffuse reflection output is thus performed.

(Processing Procedure)

Figure 6:
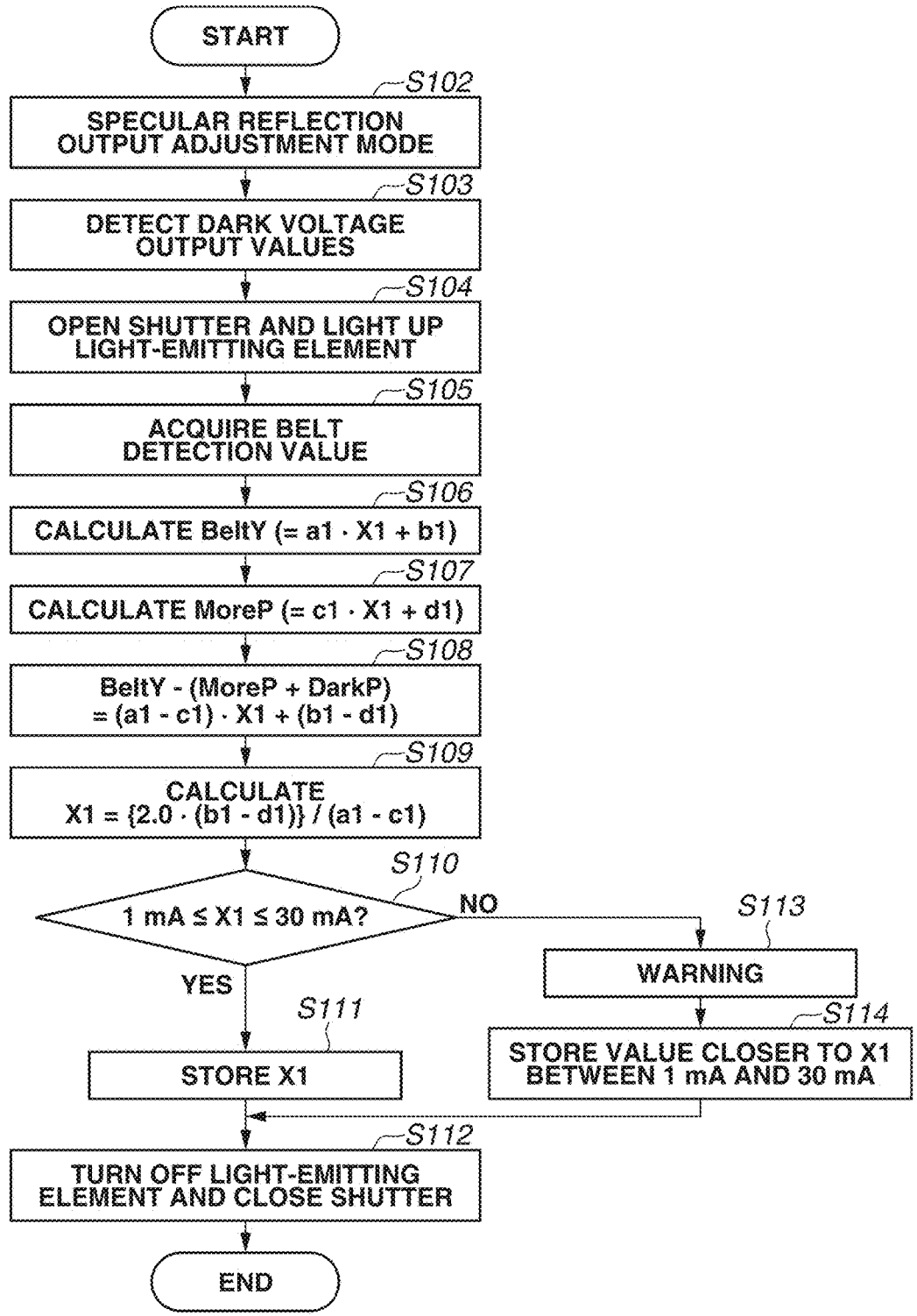
FIG. 6 is a flowchart illustrating adjustment control of a specular reflection output.
Figure 7:
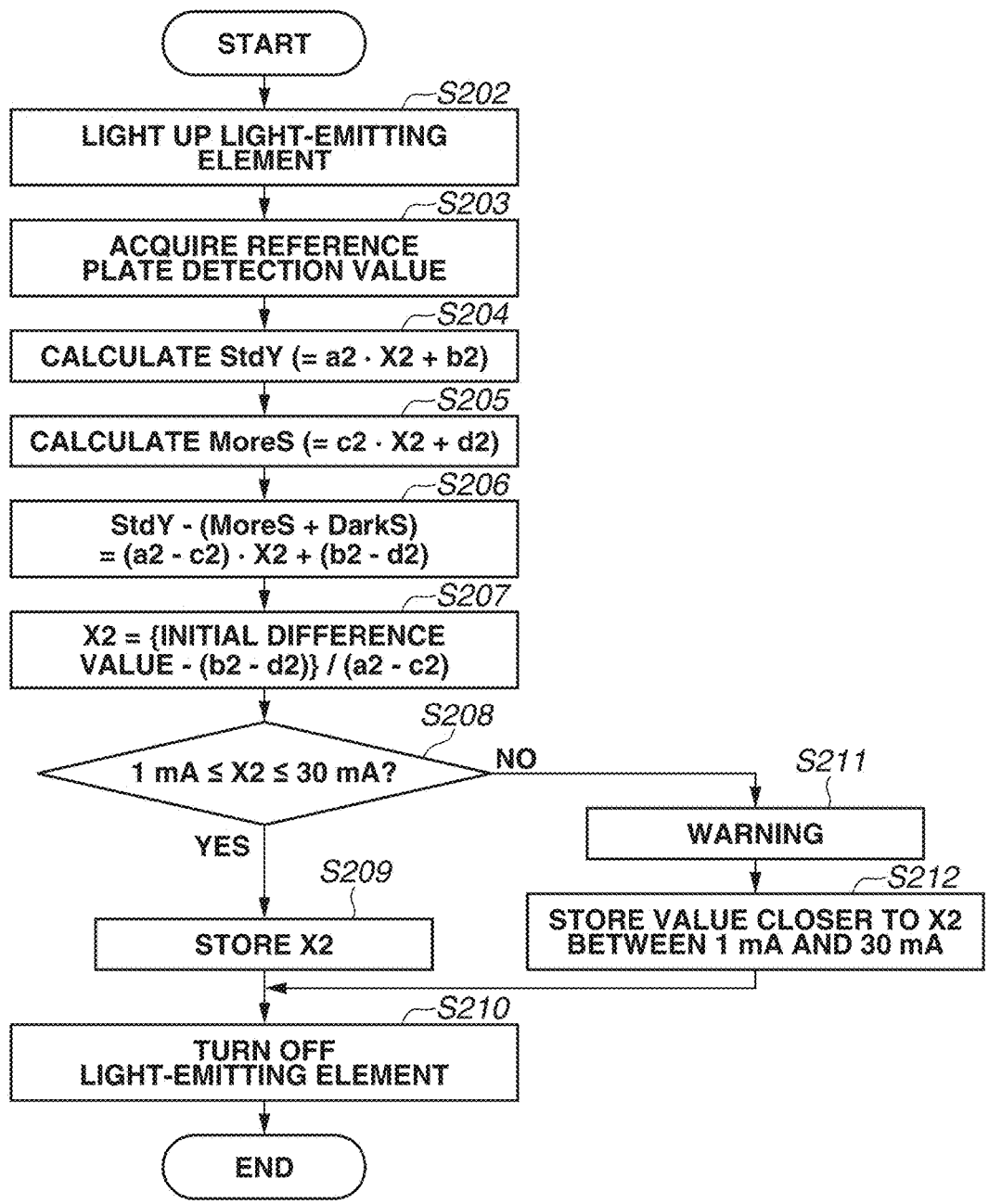
FIG. 7 is a flowchart illustrating adjustment control of a diffuse reflection output.

With reference to flowcharts in FIGS. 6 and 7, a procedure of the above output adjustment control of the image density sensor 60 is described. FIG. 6 is a flowchart illustrating the adjustment control of the specular reflection output. FIG. 7 is a flowchart illustrating the adjustment control of the diffuse reflection output. In this case, an example is described where, after the image forming apparatus is turned on, the adjustment control of the specular reflection output is performed, and next, the adjustment control of the diffuse reflection output is performed.

If the image forming apparatus starts, then in step S102, the control unit 500 starts operating in a specular reflection output adjustment mode. In step S103, the control unit 500 acquires analog detection values (dark voltage output values DarkP and DarkS) of the light-receiving elements 102 and 103 in the state where the light-emitting element 101 of the image density sensor 60 does not emit light. Then, the control unit 500 stores the analog detection values in the EEPROM 502. In step S104, the control unit 500 causes the SL driving circuit 505 to control the shutter SL 61, thereby bringing the shutter 110 into an open state. Then, the control unit 500 starts lighting up the light-emitting element 101 of the image density sensor 60. In step S105, while varying the driving current of the light-emitting element 101 in five levels between 1.25 mA and 20 mA, the control unit 500 acquires an analog detection value (a belt detection value) of the light-receiving element 102 when the intermediate transfer belt 31 is detected at each driving current.

In step S106, the control unit 500 calculates a linear approximation expression BeltY (=a1·X1+b1), which is a relational expression between the belt detection value and the driving current of the light-emitting element 101. a1 and b1 are predetermined constants. In the example of FIG. 5, a1 is 0.146, and b1 is 0.567. In step S107, based on leaking light output values according to driving currents at two points of the light-emitting element 101 that are stored in the EEPROM 502, the control unit 500 calculates a linear approximation expression MoreP (=c1·X1+d1), which is a relational expression between a leaking light output value of specular reflection and the driving current of the light-emitting element 101. In the EEPROM 502, leaking light output values of the light-receiving element 102 corresponding to driving currents at two points are stored in advance. Based on these values, the linear approximation expression MoreP is calculated. c1 and d1 are predetermined constants. In the example of FIG. 5, c1 is 0.052, and d1 is 0.027. The driving currents at two points are 2.5 mA and 20 mA, for example.

In step S108, based on the dark electric power output value DarkP of specular reflection, the belt detection value, and the leaking light output value of specular reflection, the control unit 500 calculates a difference value. The difference value is a value ($=(a1-c1) \cdot X1+(b1-d1)$) obtained by subtracting the leaking light output value (MoreP) of specular reflection and the dark voltage output value DarkP of specular reflection from the belt detection value (BeltY). In step S109, the control unit 500 calculates a driving current X1 of the light-emitting element 101 at which the calculated difference value becomes a target voltage of 2.0 V. The driving current X1 is calculated by, for example, the expression $\{2.0 \cdot (b1-d1)\}/(a1-c1)$. In step S110, the control unit 500 determines whether the calculated driving current X1 of the light-emitting element 101 falls within the range of 1 mA or more, and 30 mA or less. It is determined here whether the calculated driving current X1 falls within the range of 1 mA to 30 mA because the light-emitting element 101 according to the present exemplary embodiment is guaranteed to stably light up in the range of driving currents of 1 mA to 30 mA. Thus, the determination range of the driving current X1 differs depending on the light-emitting element 101 to be used, and therefore is not limited to this example.

If the driving current X1 falls within the range of 1 mA or more, and 30 mA or less (YES in step S110), then in step S111, the control unit 500 stores the current X1 as the driving current of the light-emitting element 101 for specularly reflected light in the EEPROM 502.

If the driving current X1 does not fall within the range of 1 mA or more, and 30 mA or less (NO in step S110), then in step S113, the control unit 500 determines that the adjustment control of the specular reflection output has failed and gives a user a warning. The warning is given by, for example, offering display on a display device included in the image forming apparatus, or outputting a sound. In step S114, the control unit 500 stores a value closer to the driving current X1 between 1 mA and 30 mA in the EEPROM 502. That is, the control unit 500 stores the value which is closer to the driving current X1 out of an upper limit and lower limit of a predetermined range (1 mA to 30 mA), as the driving current in the EEPROM 502. The control unit 500 which has stored the driving current in the EEPROM 502, then in step S112, turns off the light-emitting element 101 and closes the shutter 110, thereby ending the adjustment control of the specular reflection output.

The adjustment control of the specular reflection output is performed in the above processing. If the adjustment control of the specular reflection output ends, the control unit 500 continuously starts the adjustment control of the diffuse reflection output. To this end, the control unit 500 ends the specular reflection output mode and starts operating in a diffuse reflection output adjustment mode.

In step S202, the control unit 500 starts lighting up the light-emitting element 101 while maintaining the shutter 110 in the closed state. In step S203, while varying the driving current of the light-emitting element 101 in five levels between 1.25 mA and 20 mA, the control unit 500 acquires a detection result (a reference plate detection value) of the light-receiving element 102 when the diffuse reflection reference plate is detected at each driving current. In step S204, the control unit 500 calculates a linear approximation expression StdY ($=a2 \cdot X2+b2$), which is a relational expression between the driving current of the light-emitting element 101 and the reference plate detection value. a2 and b2 are predetermined constants. In step S205, based on leaking light output values according to driving currents at two points of the light-emitting element 101 that are stored in the EEPROM 502, the control unit 500 calculates a linear approximation expression MoreS ($=c2 \cdot X2+d2$), which is a relational expression between the driving current of the light-emitting element 101 and a leaking light output value of diffuse reflection. In the EEPROM 502, leaking light output values of the light-receiving element 103 corresponding to driving currents at two points are stored in advance. Based on these values, the linear approximation expression MoreS is calculated. c2 and d2 are predetermined constants. The driving currents at two points are 2.5 mA and 20 mA, for example.

In step S206, based on the dark electric power output value DarkS of diffuse reflection acquired in the process of step S103, the reference plate detection value, and the leaking light output value of diffuse reflection, the control unit 500 calculates a difference value. The difference value is a value ($=(a2-c2) \cdot X2+(b2-d2)$) obtained by subtracting the leaking light output value (MoreS) of diffuse reflection and the dark voltage output value DarkS of diffuse reflection from the reference plate detection value (StdY). In step S207, the control unit 500 calculates a driving current X2 of the light-emitting element 101 at which the calculated difference value becomes an initial difference value when the image density sensor 60 is attached to the image forming apparatus for the first time. The driving current X2 is calculated by, for example, the expression {initial difference value$-(b2-d2)$}/$(a2-c2)$. In step S208, the control unit 500 determines whether the calculated driving current X2 of the light-emitting element 101 falls within the range of 1 mA or more, and 30 mA or less. It is determined whether the calculated driving current X2 falls within the range of 1 mA to 30 mA because the light-emitting element 101 according to the present exemplary embodiment is guaranteed to stably light up in the range of driving currents of 1 mA to 30 mA. Thus, the determination range of the driving current X2 differs depending on the light-emitting element 101 to be used, and therefore is not limited to this example.

If the driving current X2 falls within the range of 1 mA or more and 30 mA or less (YES in step S208), then in step S209, the control unit 500 stores the driving current X2 as the driving current of the light-emitting element 101 for diffusely reflected light in the EEPROM 502.

If the driving current X2 does not fall within the range of 1 mA or more, and 30 mA or less (NO in step S208), then in step S211, the control unit 500 determines that the adjustment control of the diffuse reflection output has failed. Then, the control unit 500 gives the user a warning. The warning is given by, for example, offering display on the display device included in the image forming apparatus, or outputting a sound. In step S212, the control unit 500 stores the value closer to the driving current X2 between 1 mA and 30 mA in the EEPROM 502. That is, the control unit 500 stores a value which is closer to the driving current X2 between out of the upper and lower limit of a predetermined range (1 mA to 30 mA), as the driving current in the EEPROM 502. The driving current is stored in the EEPROM 502, then in step S210, the control unit 500 turns off the light-emitting element 101, thereby ending the adjustment control of the diffuse reflection output.

The adjustment control of the diffuse reflection output is performed in the above processing. When an image forming condition such as image density is corrected, the control unit 500 causes the light-emitting element 101 to emit light with an amount of light according to a driving current stored in the EEPROM 502. That is, the control unit 500 can change a detection condition of the image density sensor 60. According to the detection condition, the image density sensor 60 detects a detection image (a toner image) for density detection formed on the intermediate transfer belt 31 and inputs the detection result (the detection value) to the control unit 500. According to the detection result (the detection value) of the detection image, the control unit 500 corrects an image forming condition, and according to the corrected image forming condition, causes the image forming apparatus to form an image. Consequently, an image of which the image density is appropriately adjusted is formed on a sheet P.

A description has been given of the image density sensor 60 configured to include the light-emitting element 101 of which the amount of light varies according to a driving current. Alternatively, the image density sensor 60 may be configured to include a light-emitting element of which the amount of light varies according to, for example, a driving voltage. In this configuration, in the EEPROM 502, a leaking light output value of the light-receiving element 102 corresponding to a driving voltage at two points and a leaking light output values of the light-receiving element 103 corresponding to a driving voltage at two points are stored in advance. Then, the control unit 500 calculates the driving voltage of the light-emitting element 101 at which a calculated difference value becomes a target voltage of 2.0 V.

A second exemplary embodiment is described below. In the first exemplary embodiment, the outputs of the light-receiving elements 102 and 103 are adjusted by adjusting the driving current of the light-emitting element 101. In the second exemplary embodiment, the outputs of the light-receiving elements 102 and 103 are adjusted by varying the amplification factors of the output voltages of the light-receiving elements 102 and 103.

(Control Unit)

Figure 8:
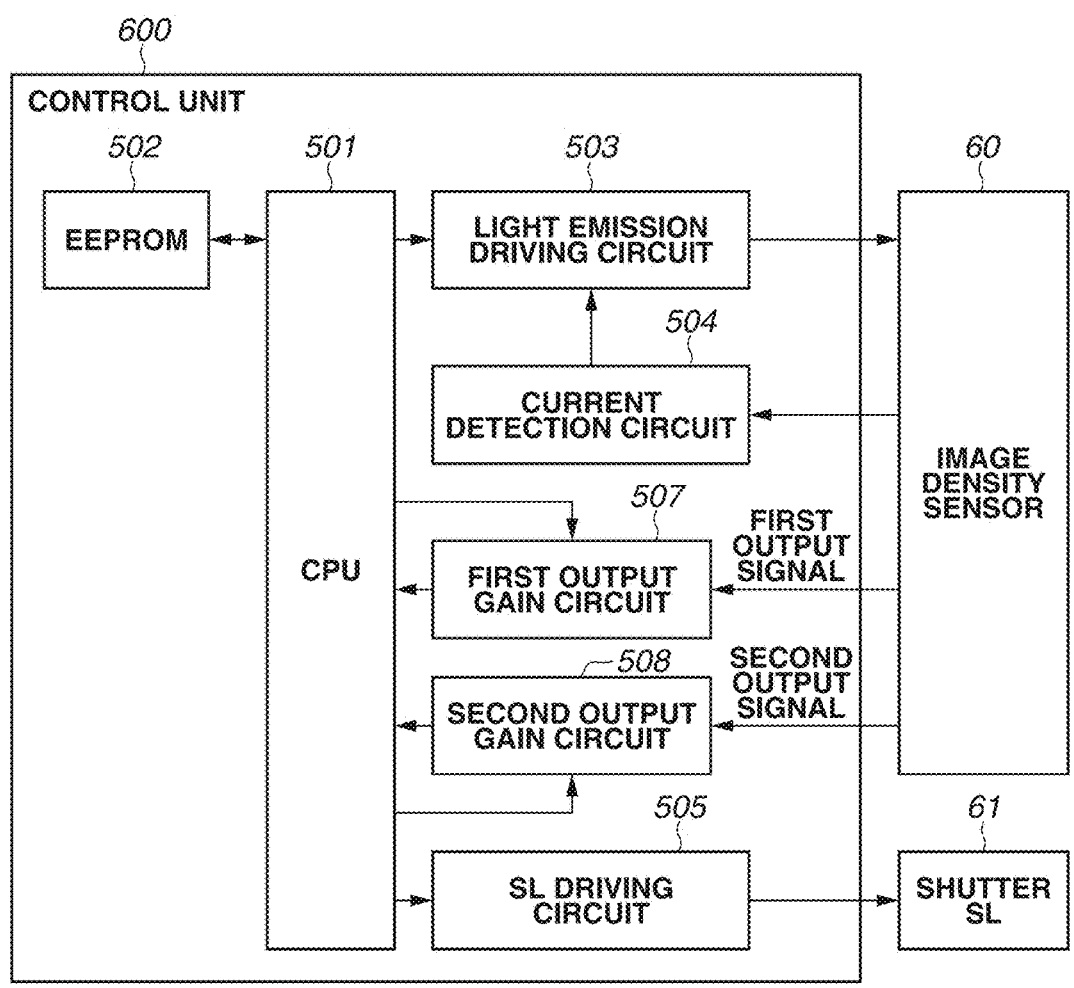
FIG. 8 is a diagram illustrating a configuration of a control unit.

FIG. 8 is a diagram illustrating the configuration of a control unit according to the second exemplary embodiment. A control unit 600 has a configuration in which a first output gain circuit 507 and a second output gain circuit 508 are added to the control unit 500 according to the first exemplary embodiment. The first output gain circuit 507 acquires a first output signal from the light-receiving element 102 of the image density sensor 60 and amplifies the acquired first output signal. The second output gain circuit 508 acquires a second output signal from the light-receiving element 103 of the image density sensor 60 and amplifies the acquired second output signal. In the present exemplary embodiment, each of the first output gain circuit 507 and second output gain circuit 508 is configured to perform switching control of its amplification factor in eight levels. The amplification factor of each of the first output gain circuit 507 and second output gain circuit 508 is switched by an instruction from the CPU 501. In the first exemplary embodiment, the light emission driving circuit 503 performs variable control of the driving current. In the second exemplary embodiment, the light emission driving circuit 503 fixes the driving current at 5 mA.

(Output Adjustment Control)

Figure 9:
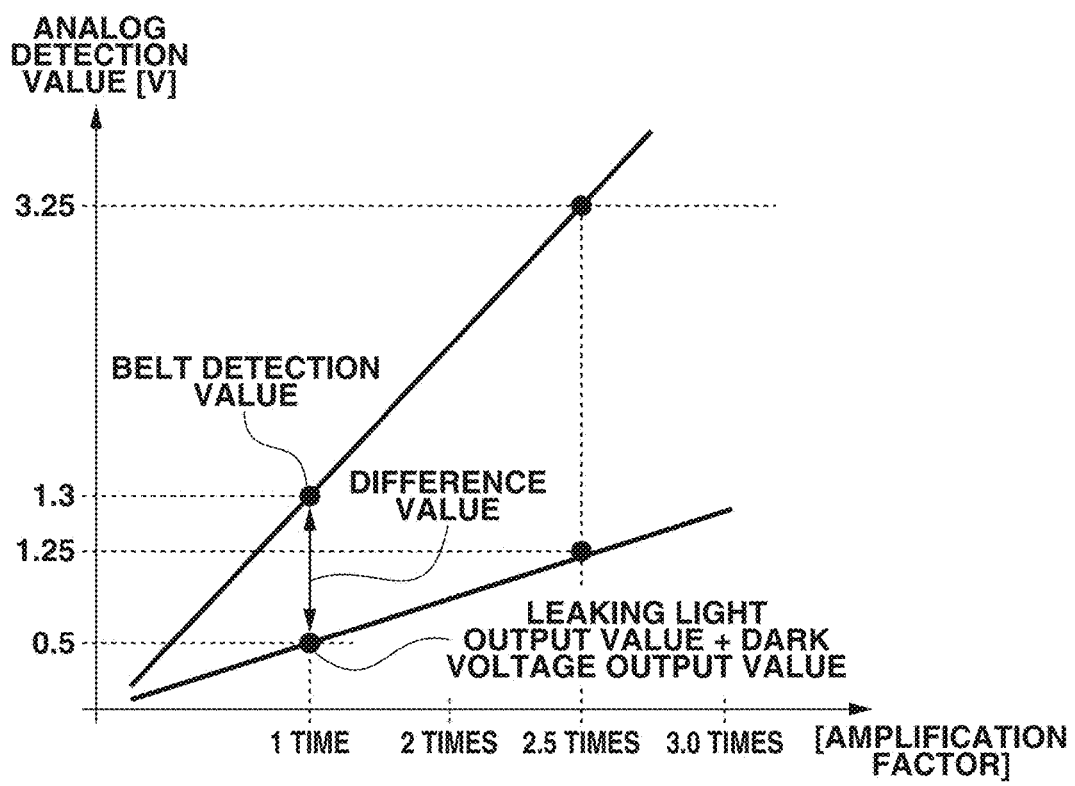
FIG. 9 is a diagram illustrating output adjustment control of an image density sensor.

FIG. 9 is a diagram illustrating the output adjustment control of the image density sensor 60. Herein, the adjustment control of the specular reflection output of the image density sensor 60 is described.

In the adjustment control of the specular reflection output, first, dark voltage output values are detected. The dark voltage output values are a first and second output signal in the state where a driving current is not applied to the light-emitting element 101, and the light-emitting element 101 does not emit light. Similarly to the first exemplary embodiment, the CPU 501 detects as a dark electric power output the average value of detection results obtained by performing sampling 10 times in a 5-millisecond cycle.

Next, if a lighting start command is input from the CPU 501, the light emission driving circuit 503 drives the light-emitting element 101 at a driving current of 5 mA. Simultaneously, the SL driving circuit 505 acquires from the CPU 501 a control signal for opening the shutter 110 and drives the shutter SL 61, thereby bringing the shutter 110 into an open state. Further, the first output gain circuit 507 acquires from the CPU 501 a command to set the amplification factor to a single time. The control unit 600 acquires a detection result (a belt detection value) in the intermediate transfer belt 31 which is obtained by the image density sensor 60 in this state. In FIG. 9, the belt detection value is indicated as a point of 1.3 V. Further, a leaking light output value when the light-emitting element 101 is driven at a driving current of 5 mA is stored in advance in the EEPROM 502. In the first exemplary embodiment, the EEPROM 502 stores leaking light output values at two points, namely 2.5 mA and 20 mA. In the second exemplary embodiment, however, the EEPROM 502 may store a leaking light output value at only a single point.

FIG. 9 illustrates as a point of 0.5 V a value obtained by summing up the leaking light output value when the light-emitting element 101 is driven at a driving current of 5 mA, and the dark voltage output value. The CPU 501 calculates a difference value (1.3-0.5=0.8 V) obtained by subtracting the leaking light output value and the dark voltage output value from the belt detection value. By the following expression, the CPU 501 calculates an amplification factor at which this difference value becomes 2.0 V or more.

$$(\text{amplification factor}) \geq 2.0/0.8 = 2.5 \qquad (\text{expression 2})$$

In the present exemplary embodiment, the calculation result indicates that a difference value of 2.0 V is obtained with an amplification factor of 2.5 times or more. The CPU 501 generates a control signal for switching the amplification factor of the first output gain circuit 507 to the lowest amplification factor in this condition. In the present exemplary embodiment, as illustrated in FIG. 9, there are options of a plurality of amplification factors such as 2 times, 2.5 times, 3 times, . . . beyond a single time. The first output gain circuit 507 is controlled to obtain an amplification factor of 2.5 times. At this time, the belt detection value is 3.25 V, and a value obtained by summing up the leaking light output value and the dark voltage output value is 1.25 V.

(Processing Procedure)

With reference to a flowchart in FIG. 10, the processing procedure of the above adjustment control of the specular reflection output of the image density sensor 60 is described. After the image forming apparatus is turned on, the image forming apparatus performs the adjustment control of the specular reflection output. The adjustment control of the diffuse reflection output is also performed in similar processing.

If the image forming apparatus starts, in step S302, the control unit 600 starts operating in a specular reflection output adjustment mode. In step S303, the control unit 600 acquires analog detection values (dark voltage output values DarkP and DarkS) of the light-receiving elements 102 and 103 in the state where the light-emitting element 101 of the image density sensor 60 does not emit light. The control unit 600 stores the analog detection values in the EEPROM 502. In step S304, the control unit 600 causes the SL driving circuit 505 to control the shutter SL 61, thereby bringing the shutter 110 into an open state. Then, the control unit 600 starts lighting up the light-emitting element 101 of the image density sensor 60 and simultaneously sets the amplification factor of the first output gain circuit 507 to a single time. In step S305, the control unit 600 causes the light-emitting element 101 to emit light at a driving current of mA and acquires an analog detection value (a belt detection value BeltP) of the light-receiving element 102 when the intermediate transfer belt 31 is detected. In step S306, the control unit 600 reads a leaking light output value MoreP stored in advance in the EEPROM 502 which is obtained when the light-emitting element 101 is driven at a driving current of 5 mA.

In step S307, the control unit 600 calculates a difference value obtained by subtracting the leaking light output value MoreP and the dark voltage output value DarkP from the belt detection value BeltP. In step S308, the control unit 600 calculates an amplification factor (Gain=2.0/(BeltP−(MoreP+DarkP))) by which the calculated difference value becomes 2.0 V or more. As illustrated in the above expression 2, in the present exemplary embodiment, a calculation result is obtained which indicates that an amplification factor of 2.5 times or more is required in the state of FIG. 9.

In step S309, the control unit 600 determines whether the calculated amplification factor (Gain) falls within the range of 0.5 to 5 times, in which switching control of the amplification factor (Gain) can be performed. It is determined whether the calculated amplification factor (Gain) falls within the range of 0.5 times to 5 times because an electric circuit of the first output gain circuit 507 according to the present exemplary embodiment is configured to be switched in the range of 0.5 times to 5 times. Thus, the switching range changes by optionally designing the electric circuit, and therefore is not limited to this example. If the amplification factor falls within the range (YES in step S309), then in step S310, the control unit 600 selects the minimum amplification factor satisfying the calculation result. Since in the present exemplary embodiment, an amplification factor of 2.5 times (see FIG. 9) can be selected, the control unit 600 selects 2.5 times as the minimum amplification factor. If the amplification factor calculated in the process of step S308 is 2.7 times or more, as illustrated in FIG. 9, the minimum amplification factor satisfying the calculation result is 3 times. Thus, the control unit 600 selects 3 times as the minimum amplification factor.

In step S311, the control unit 600 determines whether there is a possibility that a value obtained by amplifying the belt detection value (BeltP) with the minimum amplification factor (Gain) exceeds 5 V. It is determined herein whether a value obtained by amplifying the belt detection value (BeltP) with the minimum amplification factor (Gain) is 5 V or less because the allowable voltage of an analog input signal of the CPU 501 in the present exemplary embodiment is limited to 5 V or less. Thus, the allowed input voltage differs depending on the type of the CPU 501 and the value as a determination criterion is not limited to this one. If a value obtained by amplifying the belt detection value (BeltP) with the minimum amplification factor (Gain) does not exceed 5 V (YES in step S311), in step S312, the control unit 600 stores the minimum amplification factor selected in the process of step S310 in the EEPROM 502, as the amplification factor to be set for the first output gain circuit 507.

If a value obtained by amplifying the belt detection value (BeltP) with the minimum amplification factor (Gain) exceeds 5 V (NO in step S311), then in step S314, the control unit 600 determines that the adjustment control of the specular reflection output has failed. Then, the control unit 600 gives the user a warning. The warning is given by, for example, offering display on the display device included in the image forming apparatus, or outputting a sound. In step S315, the control unit 600 selects an amplification factor one level smaller than the minimum amplification factor selected in the process of step S310 and stores the selected amplification factor in the EEPROM 502.

If the amplification factor (Gain) does not fall within the range of 0.5 to 5 times, in which switching control of the amplification factor (Gain) can be performed (NO in step S309), then in step S316, the control unit 600 determines that the adjustment control of the specular reflection output has failed. Then, the control unit 600 gives the user a warning. The warning is given by, for example, offering display on the display device included in the image forming apparatus, or outputting a sound. In step S317, the control unit 600 stores a value closer to the minimum amplification factor between 0.5 times and 5 times in the EEPROM 502. That is, the control unit 600 stores the value which is closer to the amplification factor (Gain) calculated in the process of step S308, out of an upper limit and lower limit of a predetermined range (0.5 to 5 times), as the amplification factor in the EEPROM 502.

The control unit 600 stores the amplification factor in the EEPROM 502, then in step S313, the control unit 600 turns off the light-emitting element 101 and closes the shutter 110, thereby ending the adjustment control of the specular reflection output.

When an image forming condition such as image density is corrected, the control unit 600 amplifies the outputs of the light-receiving elements 102 and 103 with output gains according to amplification factors stored in the EEPROM 502. That is, the control unit 600 can change a detection condition for the image density sensor 60. According to the detection condition, the image density sensor 60 detects a detection image (a toner image) for density detection formed on the intermediate transfer belt 31 and inputs the detection result (the detection value) to the control unit 600. According to the detection result (the detection value) of the detection image, the control unit 600 corrects an image forming condition, and according to the corrected image forming condition, causes the image forming apparatus to form an image. Consequently, an image of which the image density is appropriately adjusted is formed on a sheet P.

The image density sensor 60 performs the output adjustment control as described above in the first and second exemplary embodiments to obtain a sensitivity characteristic sufficient to detect and correct image density and determines an appropriate amplification factor by which output is not saturated. As described above, by the output adjustment control of the image density sensor 60 according to the present exemplary embodiment, it is possible to reduce individual differences in density detection sensitivity characteristic occurring due to variation in the amount of leaking light, and a decrease in the density detection sensitivity characteristic occurring due to an increase in the amount of leaking light associated with an increase in the amount of light of a light-emitting element. Thus, it is possible to reduce variation in the density correction accuracy of each image forming apparatus and achieve stable density correction even after durable years.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-248062, filed Dec. 21, 2016, which is hereby incorporated by reference herein in its entirety.

What is claimed is:

1. An image forming apparatus comprising:
an image forming unit configured to form an image on a sheet based on an image forming condition;
a reference member;
a sensor including a substrate, a light-emitting element provided on the substrate, a light-receiving element provided on the substrate, and a blocking member provided between the light-emitting element and the light-receiving element on the substrate, the sensor configured to output an output value based on a light reception result of the light-receiving element;
a memory storing data related to a relationship between a plurality of light-emitting conditions of the light-emitting element and a plurality of leaking light output values corresponding to leaking light reception results of the light-receiving element; and
a controller configured to control the image forming unit to form a measurement image, control the light-emitting element to emit light based on a measurement light-emitting condition, control the light-receiving element to receive reflected light from the measurement image, control the sensor to output a measurement image output value corresponding to a light reception result of the reflected light from the measurement image, and control the image forming condition based on the measurement image output value,
wherein the controller controls the light-emitting element to emit light based on a first light-emitting condition, controls the light receiving element to receive first reflected light from the reference member, controls the sensor to output a first output value corresponding to a light reception result of the first reflected light from the reference member, controls the light-emitting element to emit light based on a second light-emitting condition, controls the light-receiving element to receive second reflected light from the reference member, controls the sensor to output a second output value corresponding to a light reception result of the second reflected light from the reference member, and determines the measurement light-emitting condition based on the first output value, the second output value and the data stored in the memory.

2. The image forming apparatus according to claim 1, wherein the controller acquires a blackout output value output from the sensor without causing the light-emitting element to emit light, and
wherein based on the first output value, the second output value, the data stored in the memory, and the blackout output value, the controller determines the measurement light-emitting condition.

3. The image forming apparatus according to claim 1, further comprising a transfer member onto which the measurement image is transferred,
wherein the light-receiving element receives specularly reflected light from the measurement image on the transfer member, and
wherein the reference member corresponds to the transfer member.

4. The apparatus according to claim 1, wherein the light-receiving element receives diffusely reflected light from the image.

5. The image forming apparatus according to claim 1, wherein the measurement light-emitting condition corresponds to a driving current for adjusting an amount of light of the light-emitting element.

6. The image forming apparatus according to claim 1, wherein the measurement light-emitting condition corresponds to a driving voltage for adjusting an amount of light of the light-emitting element.

7. The image forming apparatus according to claim 1, further comprising a transfer member onto which the image is transferred,
wherein the light-receiving element includes a first light-receiving element configured to receive specularly reflected light from the image, and a second light-receiving element configured to receive diffusely reflected light from the image.

8. An image forming apparatus comprising:
an image forming unit configured to form an image on a sheet;
a transfer member onto which a measurement image is transferred;
a sensor including a substrate, a light-emitting element provided on the substrate, a light-receiving element provided on the substrate, and a blocking member provided between the light-emitting element and the light-receiving element on the substrate, the sensor being configured to output an output value based on a light reception result of the light-receiving element;
an amplification circuit configured to amplify the output value output from the sensor based on an amplification factor;
a memory storing a leaking light output value corresponding to a leaking light reception result of the light-emitting element; and
a controller configured to control the image forming unit to form a measurement image, control the light-emitting element to emit light, controls the light-receiving element to receive reflected light from the measurement image, control the sensor to output a measurement image output value corresponding to a light reception result of the reflected light from the measurement image, control the amplification circuit to amplify the measurement image output value based on a measurement amplification factor, and control the image forming condition based on the amplified measurement image output value,
wherein the controller controls the light-emitting element to emit light based on a reference light-emitting condition, controls the light-receiving element to receive reflected light from the transfer member, controls the sensor to output a transfer member output value corresponding to a light reception result of the reflected light from the transfer member, and determine the measurement amplification factor based on the transfer member output value and the leaking light output value stored in the memory.

9. The image forming apparatus according to claim 8,
wherein the controller acquires a blackout output value output from the sensor without causing the light-emitting element to emit light, and
wherein based on the transfer member output value, the leaking light output value, and the blackout output value, the controller determines the measurement amplification factor.

10. The image forming apparatus according to claim 9, wherein the controller determines the amplification factor of the amplification circuit so that a difference value obtained by subtracting the leaking light output value and the blackout output value from the transfer member output value becomes a target value.

11. The image forming apparatus according to claim 8, wherein the sensor further includes another light-receiving element configured to receive diffusely reflected light from the measurement image, and
wherein the light-receiving element receives specularly reflected light from the measurement image.

12. The image forming apparatus according to claim 8, wherein the light-receiving element includes a first light-receiving element configured to receive specularly reflected light from the image, and a second light-receiving element configured to receive diffusely reflected light from the image.

* * * * *